(12) United States Patent
Jin et al.

(10) Patent No.: US 11,258,388 B1
(45) Date of Patent: Feb. 22, 2022

(54) SYSTEMS AND METHODS FOR PERFORMING MOTOR CONTROL OPERATIONS AGNOSTIC OF SPEED DATA

(71) Applicant: Rockwell Automation Technologies, Inc., Mayfield Heights, OH (US)

(72) Inventors: Lei Jin, Shanghai (CN); Zhendong Zhang, Mequon, WI (US); Haihui Lu, Shanghai (CN); Timothy M. Rowan, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 22 days.

(21) Appl. No.: 16/986,936

(22) Filed: Aug. 6, 2020

(51) Int. Cl.
*H02P 21/14* (2016.01)
*H02P 21/09* (2016.01)
*H02P 27/12* (2006.01)
*H02P 21/22* (2016.01)

(52) U.S. Cl.
CPC .............. *H02P 21/09* (2016.02); *H02P 21/22* (2016.02); *H02P 27/12* (2013.01)

(58) Field of Classification Search
CPC .......... H02P 21/14; H02P 21/09; H02P 21/22; H02P 27/12
See application file for complete search history.

(56) References Cited

U.S. PATENT DOCUMENTS

2009/0167236 A1* 7/2009 Kono ................... H02P 21/14
318/806

OTHER PUBLICATIONS

Abrahamsen, et al., "On the Energy Optimized Control of Standard and High-Efficiency Induction Motors in CT and HVAC Applications," IEEE Transactions on Industry Applications, vol. 34 No. 4, Jul./Aug. 1998, pp. 822-831.
Frenandez-Bernal, et al., "Model-Based Loss Minimization for DC and AC Vector-Controlled Motors Including Core Saturation," IEEE Transactions on Industry Applications, vol. 36 No. 3, May/Jun. 2000, pp. 755-763.
Garcia, et al., "An Efficient Controller for an Adjustable Speed Induction Motor Drive," IEEE Transactions on Industrial Electronics, vol. 41 No. 41, Oct. 1994, pp. 533-539.
Kirschen, et al., "On-Line Efficiency Optimization of a Variable Frequency Induction Motor Drive," IEEE Transactions on Industry Applications, vol. IA-21 No. 4, May/Jun. 1985 pp. 610-616.

(Continued)

*Primary Examiner* — Cortez M Cook
(74) *Attorney, Agent, or Firm* — Fletcher Yoder, P.C.

(57) ABSTRACT

A system may include an inverter configured to convert a direct current (DC) voltage to an alternating current (AC) voltage. The system may also include a control system communicatively coupled to the inverter. The control system may receive a torque current feedback from a motor and may generate, based on the torque current feedback, a command torque current and a command flux current. The control system may generate, based on the command torque current and the command flux current, a command torque voltage and a command flux voltage and may generate, based on a slip frequency and a rotor frequency, a command frequency. The control system may determine one or more operating parameters for the inverter based on the command frequency, the command torque voltage, and the command flux voltage and may control the inverter based on the one or more operating parameters.

20 Claims, 6 Drawing Sheets

(56) References Cited

OTHER PUBLICATIONS

Nagata, et al., "A Simple Robust Voltage Control of High Power Sensorless Induction Motor Drives With High Start Torque Demand," IEEE Transactions on Industry Applications, vol. 44. No. 2, Mar./Apr. 2008 pp. 604 611.

Okuyama, et al., "A High Performance Speed Control Scheme of Induction Motor Without Speed and Voltage Sensors," IEEE, Hitachi Research Laboratory, Hitachi, Ltd, 1986 pp. 106-111.

* cited by examiner

SYSTEMS AND METHODS FOR PERFORMING MOTOR CONTROL OPERATIONS AGNOSTIC OF SPEED DATA

BACKGROUND

This disclosure relates generally to systems and methods for improving motor efficiency optimization within industrial automation systems. More specifically, the present disclosure discusses controlling the voltage supplied by an inverter based on the output of an induction motor, which may be part of the industrial automation systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An industrial plant system is managed and operated using a control and monitoring system. To effectively control and efficiently operate (e.g., reducing power loss) the industrial plant system, the control and monitoring system may receive real-time data related to the operation or output of a power converter that is part of the industrial plant system to control an operation of one or more devices within the industrial plant system. Although some methods of controlling operation are directed at making changes when a connected motor is operating at a steady speed. In some cases, the speed of the motor and/or load conditions of the motor may vary during operation of the industrial plant system. As such, improved systems and methods for controlling the operation of the power converters under various motor speed and load conditions are desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include an inverter configured to convert a direct current (DC) voltage to an alternating current (AC) voltage and configured to supply the AC voltage to a motor. The system may also include a control system communicatively coupled to the inverter. The control system may receive a torque current feedback from the motor and may generate, based on the torque current feedback, a command torque current and a command flux current. The control system may generate, based on the command torque current and the command flux current, a command torque voltage and a command flux voltage and may generate, based on a slip frequency and a rotor frequency, a command frequency. The control system may determine one or more operating parameters for the inverter based on the command frequency, the command torque voltage, and the command flux voltage and may control the inverter based on the one or more operating parameters.

In another embodiment, A method includes receiving a current feedback associated with a motor and generating, based on the current feedback, a command current. The method also includes generating, based on the command current, a first command voltage and a second command voltage and generating, based on a slip frequency and a rotor frequency, a command frequency. The method also includes determining one or more operating parameters for an inverter based on the command frequency, the first command voltage, and the second command voltage and controlling the inverter based on the one or more operating parameters.

In yet another embodiment, a non-transitory, computer-readable medium may include instructions that, when executed, cause a processor to perform operations including receiving a torque current from a motor and generating, based on the torque current, a command torque current and a command flux current. The instructions also include generating, based on the command torque current and the command flux current, a command torque voltage and a command flux voltage and generating, based on a slip frequency and a rotor frequency, a command frequency. The instructions also include determining one or more operating parameters for an inverter based on the command frequency, the command torque voltage, and the command flux voltage and controlling the inverter based on the one or more operating parameters.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
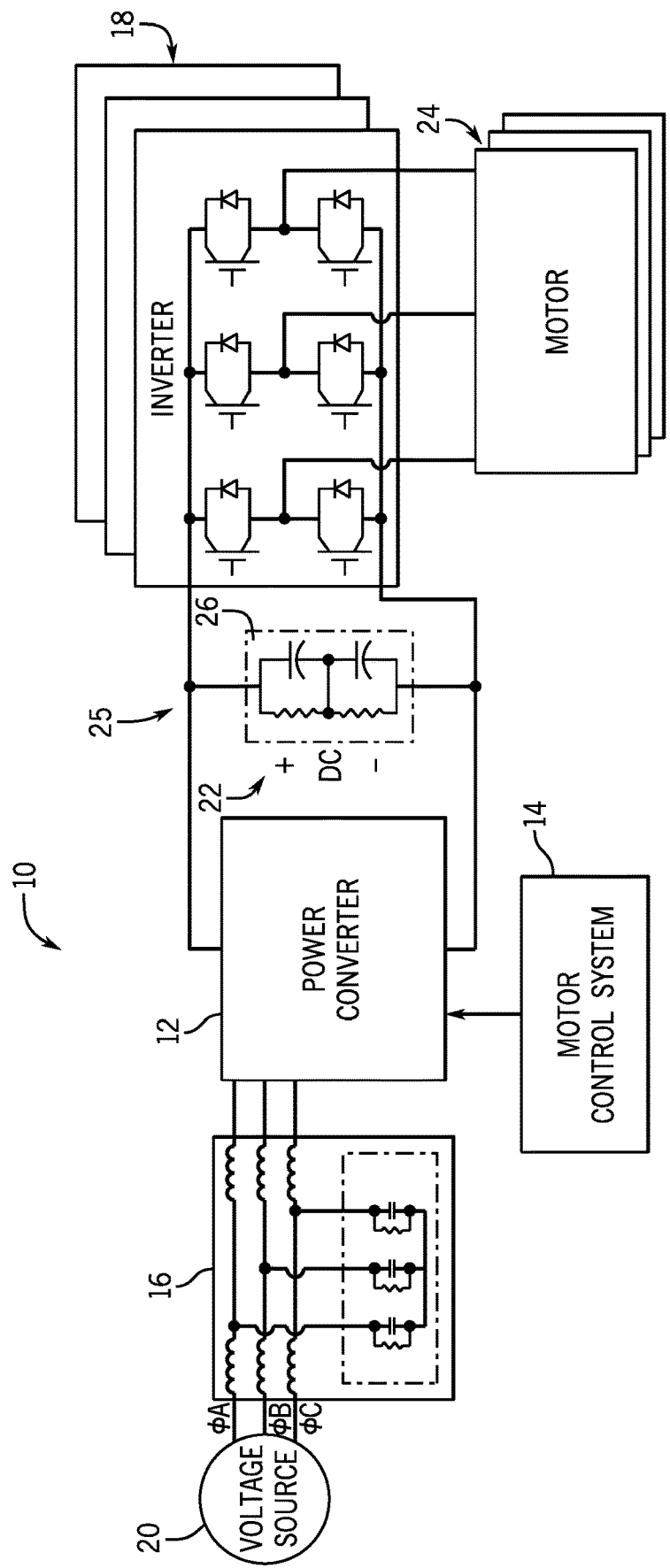
FIG. 1 is a block diagram of a control system associated with an industrial plant system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

An induction motor may operate as part of a three-phase electrical power system having three alternating current voltages offset in time, such as by one-third of a period of the voltage frequency. Vector control, or field-oriented control, is a control method that resolves the stator currents of a three-phase electrical motor into orthogonal components of torque current and flux current. The torque current may be a portion of the total current associated with a torque generated by the motor and the flux current may a portion of the total current associated with magnetizing the motor. A control system may measure the stator phase currents and may convert the stator phase currents to torque and flux components.

The present disclosure is generally directed toward techniques for improving the operation of an industrial plant system, and specifically to using a control system coupled to a power converter and/or inverter to better control the operation of the industrial plant system (e.g., plant system) without employing sensors that detect the speed (e.g., revolutions per minute) of a motor within the industrial plant system. That is, the present embodiments provide a model-based loss minimization method for induction machines while operating without speed sensors (e.g., speed-sensorless). More specifically, a machine flux level produced under a Sensorless Vector Control (SVC) mode (e.g., a technique used in variable frequency drives to rotate a force vector in a motor without the use of a shaft position sensor) is optimized based on a current load level to achieve a minimum amount of power loss for the motor. For example, the speed control system may receive current feedback from the rotor and/or stator of the motor and control the magnitude and the frequency of the voltage output to the motor by the inverter. Since many induction motors operate without speed and/or position sensors, it may be desirable to use a control and monitoring system to determine and modify operation of the industrial plant system without using data regarding the speed and/or position of the motor.

Additionally or alternatively, some control methods may be insufficient for responding to changing loads and/or speeds during the operation of the industrial plant system. That is, these control methods may attempt to reduce stator current usage instead of the total power used by the motor. However, these control methods are only effective when operating in scalar modes when the speed is stable. As a result, these control methods may operate the industrial plant system more inefficiently by increasing the overall power usage of the industrial plant system. For example, some control methods may utilize the current, or rated current, at which the motor is designed to operate at without taking into account changing loads and speeds of the motor. The torque current involved to generate a desired torque at the induction motor is related to the load. That is, a relatively larger load requires more torque and therefore a greater torque current than lower loads. As loads and/or speeds change during operation of the induction motor, the speed control system may control operation of the inverter and determine a voltage magnitude and frequency to be supplied to the induction motor without data received from sensors for detecting the speed and/or load associated with the induction motor.

However, by operating without direct knowledge of the speed and/or load associated with the induction motor, the speed control system may have difficulties with regard to operating efficiently since the total power loss of an induction motor may be dependent on the operating parameters. Moreover, to enable energy saving during dynamic speed and load changes, it may be useful to model the induction motor power loss. For example, the total power loss of an induction motor operating in steady state may be defined as follows:

$$P_{loss} \approx \frac{T_e}{P_p}\left[\left(\frac{\omega_e^2 R_r}{R_{fe}} + \frac{R_s R_\gamma}{L_m^2}\right) \cdot \frac{1}{\omega_s} + \left(1 + \frac{R_s}{R_r} \cdot \frac{L_r^2}{L_m^2}\right)\omega_s + \frac{2R_s L_r}{R_{fe} L_m} \cdot \omega_e\right] \quad [1]$$

where $T_e$ is the electromagnetic torque produced by the induction motor, $P_p$ is the number of pole pairs of the induction motor; $\omega_e$ is the stator electrical fundamental frequency, $R_r$ is the rotor resistance, $R_s$ is the stator resistance, $R_{fe}$ is the core-loss equivalent resistance, $L_r$ is the magnetizing inductance, $L_m$ is the mutual inductance, and $\omega_S$ is the slip frequency. The slip frequency is the difference in frequency between a rotational frequency of the stator's magnetic field and the rotational frequency of the rotor. A slip frequency associated with minimizing power loss of the induction motor may be described as an optimal slip frequency, which may be defined by:

$$\omega_{s(optimal)} \approx \frac{R_r}{L_r} \cdot \sqrt{\frac{R_s + (\omega_e L_m)^2 / R_{fe}}{R_s + R_r}} \quad [2]$$

Moreover, an induction machine under rotor-flux oriented control has a slip frequency in steady state defined by:

$$\omega_s = \frac{R_r}{L_r} \cdot \frac{i_{qs}}{i_{ds}} \quad [3]$$

where $i_{qs}$ is a torque current of the induction motor (i.e., the portion of the current associated with producing torque) and $i_{ds}$ is a flux current of the induction motor (i.e., the portion of the current associated with the flux and magnetization). Using equations [2] and [3], a flux current associated with minimizing the power loss of the induction motor, or optimal flux current, can be determined and defined as the absolute value of the torque current multiplied by a proportionality value, K, as follows:

$$i_{ds(optimal)}^* = |i_{qs}^*| \cdot K \quad [4]$$

$$K = \sqrt{\frac{R_s + R_r}{R_s + (\omega_e L_m)^2 / R_{fe}}} \quad [5]$$

That is, in order to minimize power losses by the induction motor, the control and monitoring system determines the optimal flux current based on the torque current feedback received from the induction motor. In other words, from the power loss model provided above in Equation 1, a plot of the motor total power loss versus its slip frequency for a certain speed and load may correspond to an optimal slip frequency and a minimum loss for the motor. As such, the optimal slip frequency may be characterized according to Equation 2 shown above. Assuming a rotor-field orientation control method is employed, the optimal flux current may be determined as proportional to the torque current, as characterized in the coefficient K of Equation 5.

With the foregoing in mind, a control and monitoring system of the industrial plant system (e.g., that includes the speed control system), may use one or more system parameters other than speed and/or load data, such as a torque current, or the like, in determining operational parameters (e.g., switching frequency, voltage output, voltage magnitude, voltage frequency, or the like) for an inverter to accommodate different loads and/or speeds that may be present in the industrial plant system and ensure that power loss is minimized during operation of an induction motor. For example, in order to minimize the loss by the power converter, the present embodiments described herein aim to dynamically adjust the flux current in proportion to the detected torque current. Additional details with regard to the operations of the control and monitoring system that control the operating parameters of the inverter without receiving speed and/or load data from sensors will be described below with reference to FIGS. 1-5.

By way of introduction, FIG. 1 is a block diagram of a motor-drive system 10, which may be part of an industrial plant system. The motor-drive system 10 may include a power converter 12, one or more inverters 18, and a motor control system 14 that may control the operation of the power converter 12 and/or the one or more inverters 18. As shown, the motor-drive system 10 may also include an LCL filter 16. The LCL filter 16 may filter the input alternating current (AC) voltage provided to the power converter 12, while the inverters 18 may convert the DC voltage output by the power converter 12 into a controllable AC voltage, as will be discussed below. In one embodiment, the filter 16 may be positioned between a voltage source 20 and the power converter 12 to reduce input harmonics that may have been caused by power conversion devices (e.g., thyristors, insulated-gate bipolar transistor (IGBT), diodes) switching in the power converter 12.

In general, the power converter 12 may receive three-phase alternating current (AC) voltage from the voltage source 20 or a direct current (DC) voltage from the voltage source 20 and convert the AC voltage or DC voltage into a direct current (DC) voltage 22 suitable for powering a load (e.g., rectify a DC voltage based on the voltage from the voltage source 20). As such, the power converter 12 supplies a load (e.g., the one or more inverters 18) a DC voltage 22. In certain embodiments, the one or more inverters 18 then convert the DC voltage 22 to an AC voltage to be supplied to one or more devices connected to the inverters 18, such as motors 24. The one or more inverters 18 may then, in turn, control the speed, torque, or other suitable operation of the one or more motors 24 by controlling the AC voltage provided to the motors 24 (e.g., provided to the stator and/or rotor windings of the motor). It should be understood that the industrial plant system may include one or more motor-drive systems 10, and each of the motor-drive systems 10 may include one or more additional or fewer components that what is depicted in FIG. 1.

The power converter 12 may include any suitable rectifier device that includes a number of switches that may be controlled, and may be of any suitable power converter. For example, the power converter 12 may be an active front end (AFE) converter, a diode converter, a thyristor converter, a diode front end rectifier, or the like. In some embodiments, the switches of the power converter 12 may be semiconductor-controlled devices, transistor-based (e.g., IGBT, metal-oxide semiconductor field-effect transistor (MOSFET), or other suitable transistor) devices, or other suitable devices in which the opening and/or closing of the switch may be controlled using an external signal (e.g., gate signal), which may be provided by the control system 14. The power converter 12 may provide the DC voltage 22 (e.g., a regulated DC output voltage) on a direct current (DC) bus 25, which may be provided to the inverters 18 and may regenerate extra or additional power back to the voltage source 20. In this way, the power converter 12 may operate to maintain a unity power factor, generate a stable DC voltage (e.g., DC voltage 22) from the voltage source 20, control a power factor transmitted to the one or more inverters 18, or the like to generally control power supplied to the one or more inverters 18.

As discussed above, the power converter 12 may use the switching frequencies of the switches (e.g., power conversion devices) to convert the voltage from the voltage source 20 into the DC voltage 22. The DC voltage 22 may be generated across a resistor-capacitor (RC) circuit 26 including one or more resistors and one or more capacitors. In addition, the control system 14 may control the operation of the power converter 12 and/or the one or more inverters 18 to control the AC voltage provided to the motors 24.

Although multiple inverters 18 may be coupled in parallel to the DC voltage 22, the multiple inverters 18 and the power converter 12 may not, in some embodiments, include any communication or feedback channel between each other. In the same manner, the control system 14 may not, in some embodiments, receive data from speed and/or position sensors or other components disposed on or associated with the motors 24 that measure the speed or position of the shaft or other parts of the motors 24.

Figure 2:
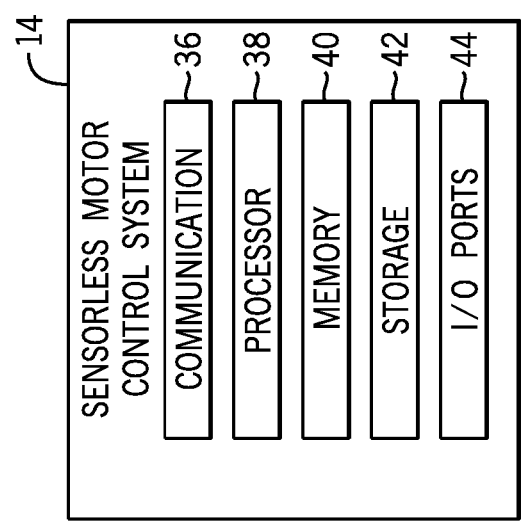
FIG. 2 is a block diagram of the control system of FIG. 1, in accordance with an embodiment.

With the foregoing in mind, the control system 14 may adjust the operation of the inverters 18 based on the received torque current and the calculated flux current. That is, the control system 14 may adjust the operation of the inverters 18 without using data regarding the speed and/or load conditions associated with the motors 24. To help explain, FIG. 2 is a block diagram of components that may make up part of the control system 14 of FIG. 1. The control system 14 may include a communication component 36, a processor 38, a memory 40, a storage 42, input/output (I/O) ports 44, and the like. The communication component 36 may be a wireless or wired communication component that facilitates communication between the control system 14, the power converter 12, the inverter 18, and/or any other suitable electronic device. The processor 38 may be any type of computer processor or microprocessor capable of executing computer-executable code. The memory 40 and the storage 42 may be any suitable articles of manufacture that may serve as media to store processor-executable code, data, or the like. These articles of manufacture may represent computer-readable media (i.e., any suitable form of memory or storage) that may store the processor-executable code used by the processor 38 to perform the presently disclosed techniques, such as to predictively respond to operational changes, or the like.

The I/O ports 44 may couple to one or more sensors, one or more input devices, one or more displays, or the like to facilitate human or machine interaction with the control system 14. For example, based on a notification provided to the operator via a display, the operator may use an input device to instruct the adjustment of a parameter associated with the control system 14.

Figure 3:
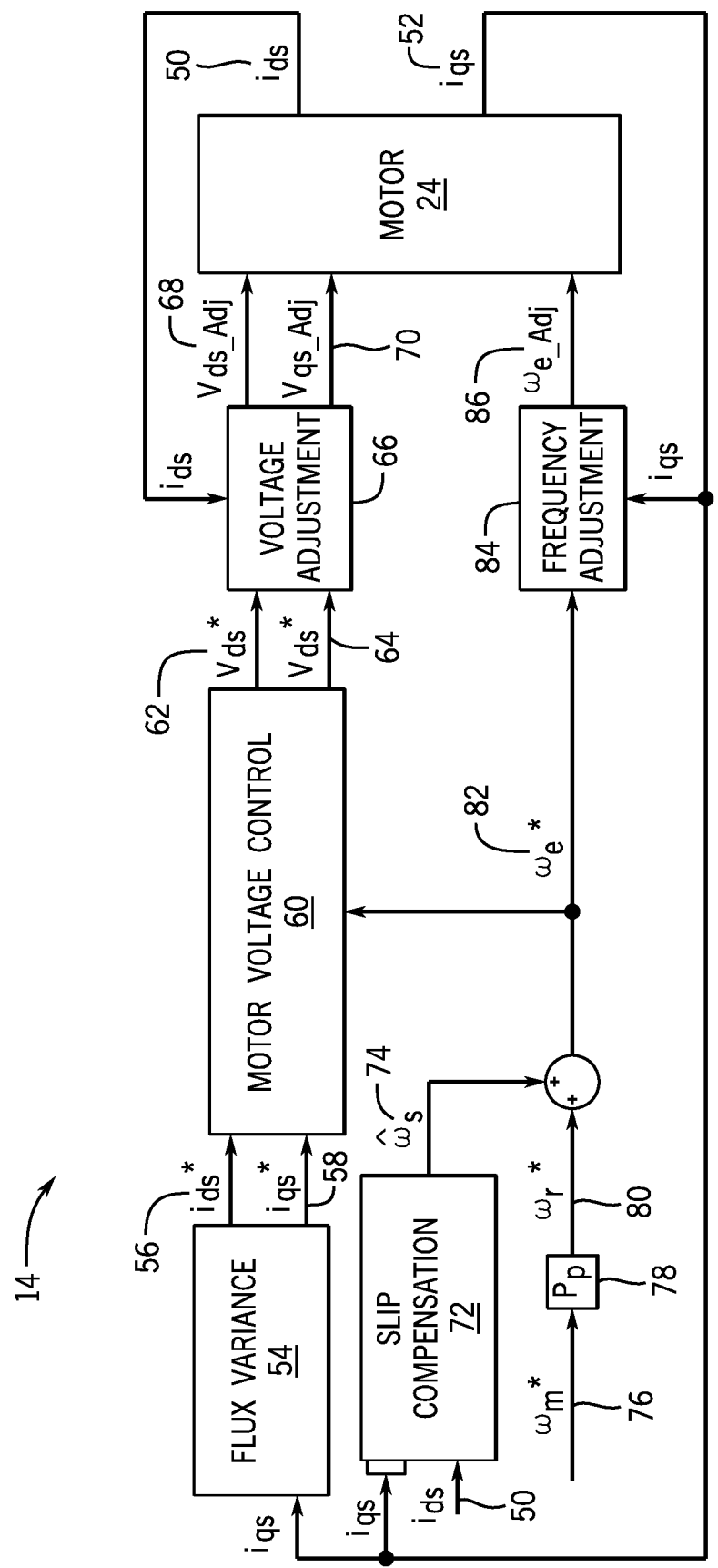
FIG. 3 is a control flow diagram associated with operations of the control system of FIG. 1, in accordance with an embodiment.

To provide control and operation of the inverters 18 by the control system 14, FIG. 3 is a control flow diagram that illustrates operations of the control system 14 (e.g., processing operations, computational operations, or the like). Generally speaking, the control system 14 may use various inputs, in conjunction with processing operations, to control the operational parameters of the inverters 18.

Referring now to FIG. 3, the control system 14 may employ a flux variance component 54, a motor voltage control component 60, a voltage adjustment component 66, a slip compensation component 72, and a frequency adjustment component 84 to control the magnitude and the frequency of the voltage supplied to the motor 24. The flux variance component 54 may receive a torque current 52 output from the motor 24. In certain embodiments, the flux variance component 54 may measure the three-phase stator current of the motor 24 and convert it to the torque-flux coordinate system to determine the torque current 52. The flux variance component 54 may then generate a command flux current 56 and a command torque current 58 based on the torque current 52. That is, the flux variance component 54 may apply a low pass filter to the torque current 52 to determine a command torque current 58 that corresponds to a desired torque current for the motor 24. In some embodiments, the flux variance component 54 may generate the command flux current 56, which corresponds to the optimal flux current, based on the equations [4] and [5] described above. That is, the command flux current 56 may correspond to the flux current that may achieve a minimum amount of power loss for the motor 24.

The flux variance component 54 may provide the command flux current 56 and the command torque current 58 to the motor voltage control component 60 to determine a command flux voltage 62 and a command torque voltage 64. In other words, the motor voltage control component 60 may generate a voltage magnitude to be applied to the motor 24 based on the command flux current 56 and the command torque current 58. In certain embodiments, the motor voltage control component 60 may generate a command flux voltage 62 and a command torque voltage 64 based on the generated command flux current 56 and the command torque current 58 according to equations 6 and 7 below:

$$V_{ds}^* = R_s i_{ds}^* - \omega_e L_\sigma i_{qs}^* \quad [6]$$

$$V_{qs}^* = R_s i_{qs}^* + \omega_e L_\sigma i_{ds}^* + \omega_e \frac{L_m^2}{L_r} \cdot LPF(i_{ds}^*) \quad [7]$$

where $L_\sigma$ is the total leakage inductance and LPF ($i_{ds}^*$) is a low pass filter applied to the command flux current 56. In certain embodiments, the low pass filter implements a transfer function of $$\frac{1}{1+sT},$$

where T is close to me rotor time constant of the motor 24.

With this in mind, it should be noted that the dynamic voltage for the flux voltage ($V_{ds}$) and the torque voltage ($V_{qs}$) may be characterized according to equations 8 and 9 below.

$$V_{ds} = R_s i_{ds} - \omega_e L_\sigma i_{qs} - \omega_e \frac{L_m}{L_r} \lambda_{qr} + \frac{L_m}{L_r} \dot{\lambda}_{dr} + L_\sigma \dot{i}_{ds} \quad [8]$$

$$V_{qs} = R_s i_{qs} + \omega_e L_\sigma i_{ds} + \omega_e \frac{L_m}{L_r} \lambda_{dr} + \frac{L_m}{L_r} \dot{\lambda}_{qr} + L_\sigma \dot{i}_{qs} \quad [9]$$

As shown in equations 8 and 9, when the flux level is steady, the derivative of $\lambda_{dr}$ is zero and the $$\omega_e L_\sigma i_{ds} + \omega_e \frac{L_m}{L_r} \lambda_{dr}$$

term is equal to $\omega_e L_s i_{ds}$. However, when the flux level is changing, the derivative of $\lambda_{dr}$ is no longer zero, and the $$\omega_e L_\sigma i_{ds} + \omega_e \frac{L_m}{L_r} \lambda_{dr}$$

term is not equal to $\omega_e L_s i_{ds}$. With this in mind, if the torque voltage is determined according to equation 10 below, the system would become unstable during a sudden load change because the command voltage $V_{qs}^*$, changes much faster than the actual change of the voltage component, $$\omega_e \frac{L_m}{L_r} \lambda_{dr}.$$

$$V_{qs}^* = R_s i_{qs}^* + \omega_e L_s i_{ds}^* \quad [10]$$

$$\omega_e \frac{L_m^2}{L_r} \cdot LPF(i_{ds}^*)$$

As such, by adding the term to the command torque voltage, the change of the command torque voltage ($V_{qs}^*$) is limited by the low pass filter, which may have a time constant close to the rotor time constant (e.g., within one tenth of a percent, within half of a percent, within one percent). Moreover, by using the command flux current 56 ($i_{ds}^*$) with the low pass filter in equation 7 instead of the feedback flux current ($i_{ds}$), the system may avoid sensitivity due to the variation of rotor-time constant.

The voltage adjustment component 66 may generate an adjusted flux voltage 68 and an adjusted torque voltage 70 based on the command flux voltage 62 and the command torque voltage 64 provided by the motor voltage control component 60. In certain embodiments, the flux current 50 output by the motor 24 may be measured by a sensor or determined based on operating characteristics of the motor 24. The voltage adjustment component 66 may receive feedback from the motor 24 (i.e., the flux current 50), such that the voltage adjustment component 66 may determine an adjusted flux voltage 68 and an adjusted torque voltage 70 that achieves the command flux voltage 62 and the command torque voltage 64, thereby providing improved stability by causing the motor 24 to converge towards a steady state after the motor 24 experiences a load and/or speed change. In certain embodiments, the voltage adjustment component 66 may use the adjusted flux voltage 68 and the adjusted torque voltage 70 to operate and control the inverters 18. That is, the adjusted flux voltage 68 and the adjusted torque voltage 70 may be used by the control system 14 to determine firing angles and control operations for the switches of the inverters 18. In certain embodiments, the control system 14 may convert the adjusted flux voltage 68 and the adjusted torque voltage 70 from the torque-flux coordinate system to a three-phase stationary coordinate system. Additionally or alternatively, the control system 14 may apply the converted voltages to the stator windings and may use pulse-width modulation to supply the converted voltages in discrete parts according to the three-phase stationary coordinate system.

The slip compensation component 72 may generate a slip frequency 74 based on the flux current 50 and the torque current 52. The control system 14 may generate a command frequency 82 based on the slip frequency 74 and the rotor frequency 80. For example, the control system 14 may compensate the rotor frequency 80 with the slip frequency 74 (i.e., sum the frequencies) in order to generate the command frequency 82. The control system 14 may include the number of pole pairs 78. The number of pole pairs 78 may determine a product of the motor frequency 76 and the number of pole pairs to generate the rotor frequency 80.

The frequency adjustment component 84 may generate an adjusted frequency 86 based on the torque current 52 and the command frequency 82. The frequency adjustment component 84 may receive feedback from the motor 24 (i.e., the torque current 52), such that the frequency adjustment component 84 may determine the adjusted frequency 86 that provides improved stability by causing the motor 24 to converge towards a steady state after the motor 24 experiences a load and/or speed change. In certain embodiments, the frequency adjustment component may use the adjusted frequency 86 to operate and control the inverters 18. That is, the adjusted frequency 86 may be used by the control system 14 to determine firing angles and control operations for the switches of the inverters 18. The control system 14 may generate an applied voltage magnitude and an applied voltage frequency to control the operation of the motor 24. The applied voltage magnitude may be generated based on the command flux voltage 68 and the command torque voltage 70. For example, the applied voltage magnitude may be defined as follows:

$$V_{mag} = \sqrt{(V_{ds\_Adj})^2 + (V_{qs\_Adj})^2} \quad [11]$$

The applied voltage frequency may be generated based on the command frequency 82. Additionally or alternatively, the control system 14 may generate three-phase voltage and frequency based on the command flux voltage 68, the command torque voltage 70, and the command frequency 86 in order to operate the motor 24.

Figure 4:
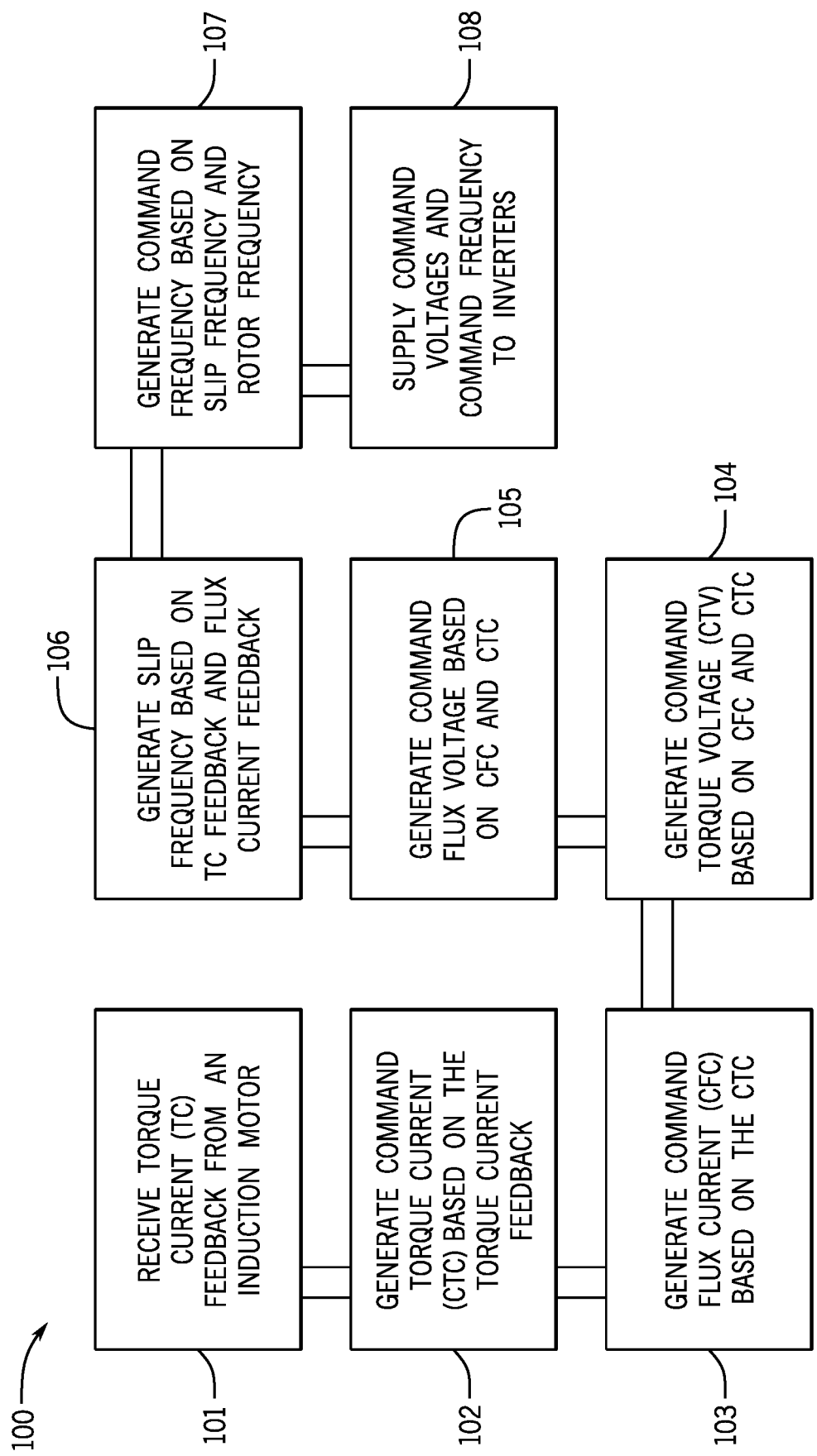
FIG. 4 is a flowchart corresponding to operations depicted in FIG. 3 and associated with the control system of FIG. 1, in accordance with an embodiment.

The above-described control flow diagram may be synthesized into a flowchart shown in FIG. 4 depicting a generalized method to determine control operations to be used with the inverters 18. FIG. 4 is a flowchart of a method 100 performed by the control system 14 to control the operation of the inverters 18. Although the method 100 is described below as performed by the control system 14, it should be noted that the method 100 may be performed by any suitable processor that controls operational parameters of the inverters 18. Furthermore, certain described steps may be implemented by executing instructions stored in a memory, using any suitable processing circuitry, such as the control system 14. In some embodiments, the memory may include one or more tangible, non-transitory computer-readable media that store instructions executable by any suitable processing circuitry and/or data to be processed by any suitable processing circuitry. For example, the memory may include random access memory (RAM), read only memory (ROM), rewritable non-volatile memory, such as flash memory, hard drives, optical discs, and/or the like. Moreover, although the following description of the method 100 is described in a particular order, it should be noted that the method 100 may be performed in any suitable order.

As described above, the control flow diagram in FIG. 3 is generalized with the method 100. For example, at block 101, the control system 14 may receive a torque current 52 feedback from the motor 24. The torque current 52 may be the portion of the current used to generate torque during the operation of the motor 24.

The control system 14 may generate, at block 102, a command torque current 58 based on the torque current 52 feedback received from and/or measured at the motor 24. For example, the control system 14 may generate the command torque current 58 by applying a low pass filter on the torque current 52. In certain embodiments, the low pass filter may have a transfer function of $$\frac{1}{1 + T_1 s},$$

where $T_1$ is a time constant. For example, $T_1$ can be 0.1 seconds if the load is not drastically changing.

The control system 14 may then, at block 103, may generate a command flux current 56 based on the command torque current 58. For example, the command flux current 56 may be proportional to the command torque current 58 by a proportionality value corresponding to a slip frequency, such as a slip frequency for minimizing power loss of the motor 24. In certain embodiments, the control system 14 may generate the command flux current 56 based on Equations 4 and 5, as described above. For example, the control system 14 may generate the command flux current 56 based on the command torque current 58 corresponding to a slip frequency associated with minimizing power loss for the motor 24.

At blocks 104 and 105, the control system 14 may generate a command torque voltage 64 and a command flux voltage 62, respectively, based on the command torque current 58 and the command flux current 56. In certain embodiments, the control system 14 may generate a voltage magnitude based on the command torque voltage 64 and the command flux voltage 62. For example, the control system 14 may generate the command torque voltage 64 based on Equation 7, as described above. In certain embodiments, the control system 14 may generate the command torque voltage 64 based on a command frequency 82 and the command torque current 58. The command torque voltage 64 may be a voltage component associated with producing torque. The control system 14 may generate the command flux voltage 62 based on Equation 6, as described above.

At block 106, the control system 14 may generate a slip frequency 74 based on the torque current 52 and a flux current 50 received and/or measured at the motor 24 and at block 107, the control system 14 may generate a command frequency 82 based on the slip frequency 74 and a rotor frequency 80. In certain embodiments, the control system 14 may generate the slip frequency 74 based on Equation 3, as described above. As such, the slip frequency 74 may be calculated based on the current feedback 50, 52 from the motor 24 and electrical properties of the motor 24. In certain embodiments, control system 14 may generate the command frequency 82 by compensating (i.e., summing) the slip frequency 74 and the rotor frequency 80. The slip frequency 74 is defined to be the difference between the rotor frequency 80 and the stator magnetic field frequency. As such, compensating the rotor frequency 80 with the slip frequency 74 yields the command frequency 82 for operating the motor 24.

At block 108, the control system 14 may use the command torque voltage 64, the command flux voltage 62, and the command frequency 82 to determine operational parameters (e.g., firing angles) for the inverters 18. The inverters 18 may, in turn, operate and control the motor 24 and minimize power loss for the motor 24.

The above-described control methods for operating an induction motor minimize power loss during changing loads and/or speeds. Previous control methods only seek to minimize stator current which only provides energy savings during steady-state operation. That is, other methods for controlling the operations of the induction motor do not involve minimizing the power losses of the induction motor during speed and/or load changes. With this in mind, FIG. 5A illustrates electrical characteristics of a motor operating under a first control method, and FIG. 5B illustrates electrical characteristics of an induction motor operating under the above-described control methods, such as the control-flow diagram of FIG. 3.

Figure 5A:
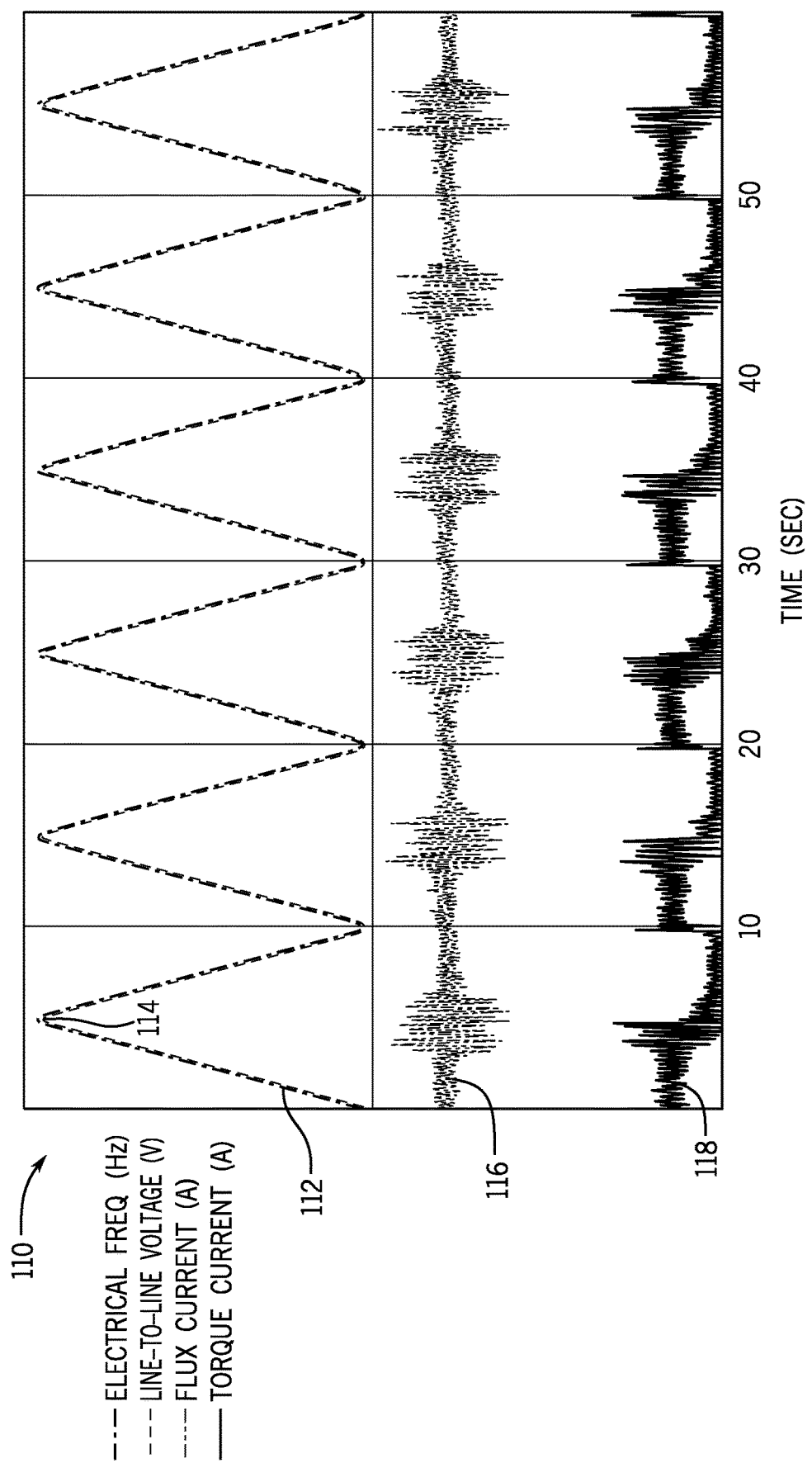
FIG. 5A is a graph depicting power consumption associated with an industrial plant system, in accordance with an embodiment.
Figure 5B:
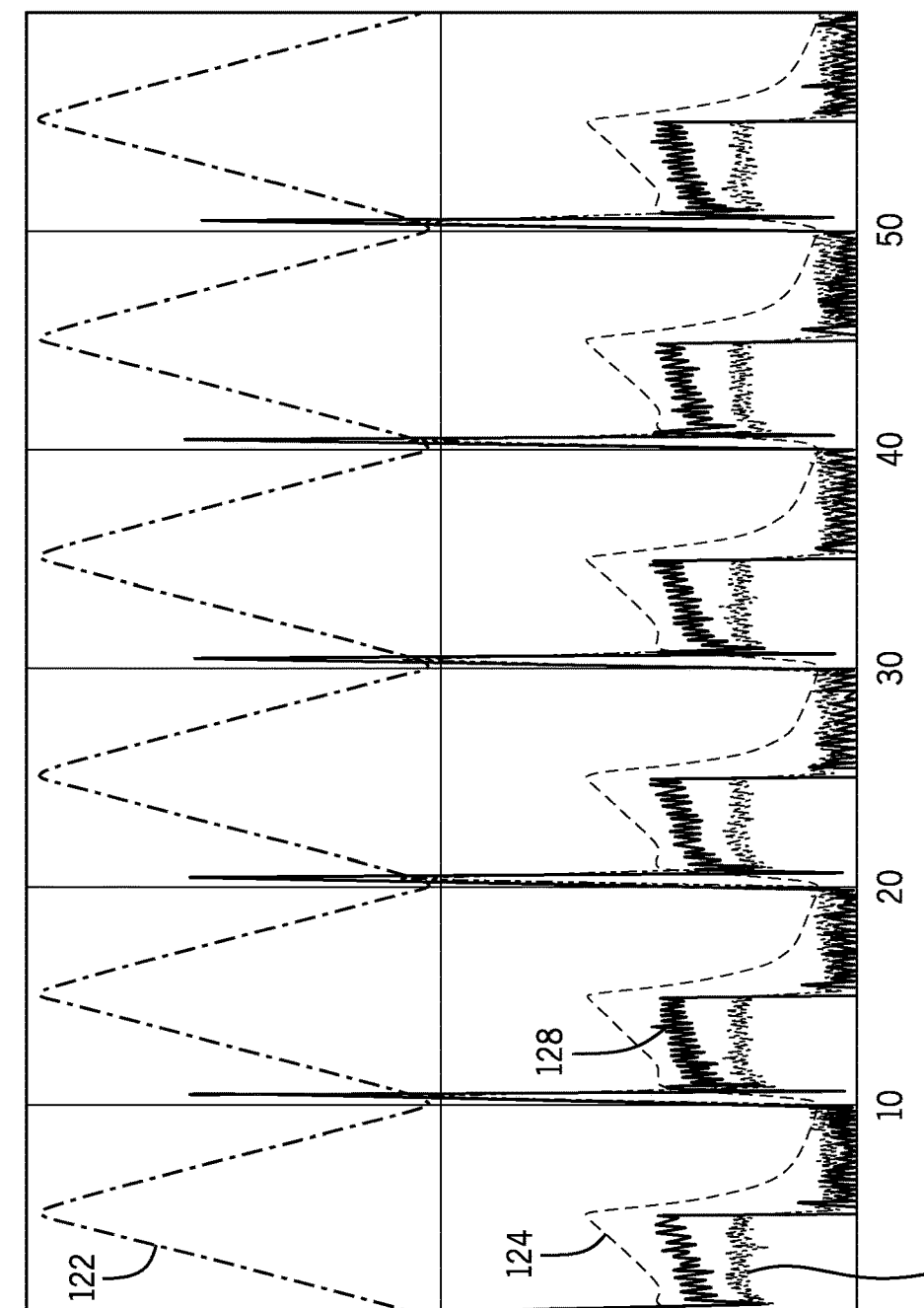
FIG. 5B is a graph depicting power consumption associated with the industrial plant system using the control system of FIG. 1, in accordance with an embodiment.

Referring first to FIG. 5A, a graph 110 depicts a frequency 112, a voltage 114, a flux current 116, and a torque current 118 for an induction motor operating at a five percent load and undergoing speed ramp cycles from fifty to one hundred percent. As illustrated, the frequency 112 and the voltage 114 exhibit a triangle wave shape during each cycle, increasing linearly from a minimum to a peak as the speed increases from fifty percent to one hundred percent during the first half of the cycle. The voltage 114 may peak at about 460 volts (e.g., within five percent) and have a minimum at about 230 volts (e.g., within five percent). After reaching the respective peaks, the frequency 112 and the voltage 114 decrease linearly back towards the minimum as the speed decreases from one hundred percent down to fifty percent. As illustrated, the flux current 116 may have a relatively steady value that is more than four times the average torque current 118. The torque current 118 may have a first, higher value as the speed increases before dropping to a second, lower value during the second half of the cycle as the speed decreases. The average power output by induction motor may be about 435 watts under the specified load and speed conditions.

To compensate for dynamic changes in speed (and/or load), the induction motor may use the control system 14, as described herein. For instance, a current feedback from the induction motor may be used to determine operating parameters which minimize power loss during operation of the induction motor. As such, FIG. 5B illustrates a graph 120 that depicts a frequency 122, a voltage 124, a flux current 126, and a torque current 128 for the motor 24 operating with the control system 14 implementing the techniques described herein. Like the motor 24 tracked in FIG. 5A, the induction motor may be operating at five percent load and undergoing speed ramp cycles from fifty to one hundred percent. As illustrated, the frequency 122 exhibits a triangle wave shape during each cycle, increasing linearly from a minimum to a peak as the speed increases from fifty percent to one hundred percent during the first half of the cycle. However, unlike the motor 24 depicted in FIG. 5A, the frequency 122 decreases linearly back towards the minimum as the speed decreases from one hundred percent down to fifty percent. The voltage 124 increases to a peak (e.g., about 150 volts) at a substantially linear rate during the first half of the speed cycle as the speed increases from fifty percent to one hundred percent. During the second half of the speed cycle as the speed decreases from one hundred percent down to fifty percent, the voltage 124 decreases exponentially from the peak down to about 20 volts (e.g., within five percent). Additionally, the voltage 124 is significantly less (e.g., between fifty to ninety percent) than the voltage 114 throughout the speed cycle. As illustrated, the flux current 126 and the torque current 128 may have a respective first, higher value as the speed increases before dropping to a respective second, lower value during the second half of the cycle as the speed decreases. Additionally, the flux current 126 is significantly less (e.g., between fifty and ninety percent) than the flux current 116 throughout the speed cycle.

As a result, the average power output by the induction motor results depicted in graph 120 may be about seventy five percent (e.g., within five percent) of the average power output by the induction motor results depicted in graph 110. This enables the control system 14 to operate the motor 24 more efficiently and reduce power output under the same load and speed conditions when compared to the control system operating the motor 24 according to the control scheme employed to achieve the results depicted in the graph 110. As such, the control system 14 minimizes power loss during dynamic speed and/or load changes of an induction motor. In certain embodiments, the command flux current and/or the command torque current may be set at a minimum threshold current value. For example, the control system 14 may maintain the command flux current and command torque current at and/or above the minimum threshold current value. The minimum threshold current value may be selected by an operator of the control system 14 based on load properties (e.g., load, torque, speed) of the industrial plant system.

Although many of the examples described herein are discussed with respect to a vector control system, the control systems may use a scalar control method (e.g., volts per hertz) or any other suitable control method by converting the equations and control methods described herein into a suitable coordinate system for use with the other control methods. For example, the control system 14 may utilize a scalar control method to control an output voltage magnitude applied to the inverters 18 based on a current feedback magnitude. The current feedback magnitude, $I_m$, may be determined based on the torque current 52 and the flux current 50 as follows:

$$I_m = \sqrt{i_{ds}^2 + i_{qs}^2} \qquad [12]$$

A flux current associated with minimizing power loss of the induction motor may be described as an optimal flux current, which may be defined by:

$$i_{ds} = \sqrt{\frac{K^2}{K^2+1}} I_m \qquad [13]$$

where K is the proportionality value described above in Equation [5]. The control system 14 may determine the output voltage magnitude, $V_m$, associated with minimizing power loss of the induction motor based on a voltage-frequency ratio defined as follows:

$$\frac{V_m}{\omega_e} \approx \sqrt{\frac{K^2}{K^2+1}} I_m * L_m \qquad [14]$$

where $\omega_e$ is the stator electrical fundamental frequency and $L_m$ is the mutual inductance. While the above example describes a scalar control method for controlling operational parameters for an induction motor, any other suitable scalar control method may be utilized by the control system 14 for controlling the operational parameters and minimizing power loss associated with an induction motor.

Technical effects of the present disclosure include techniques for using a control system that generates control voltages and a control frequency for operating inverters and minimizing power loss of an induction motor without receiving data concerning the speed and/or load conditions of the motor. That is, system efficiency requirements are becoming increasingly important to users. As such, the technical effects of the present embodiments described above enable motors to increase an effectiveness of certain energy-saving modes of operations for motors that attempts to minimize motor current (not energy) and while operating in scalar (V/F) modes (e.g., when the motor has stabilized at a set speed). More specifically, the techniques described above provides a methodology for binding a flux current of the motor with a torque current of the motor to minimize the motor's power losses without sensing the motor's position and speed.

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
an inverter configured to convert a direct current (DC) voltage to an alternating current (AC) voltage and configured to supply the AC voltage to a motor; and
a control system communicatively coupled to the inverter, wherein the control system is configured to:
receive a torque current feedback associated with the motor;
generate, based on the torque current feedback, a command torque current and a command flux current;
generate, based on the command torque current and the command flux current, a command torque voltage, and a command flux voltage;
generate, based on a slip frequency and a rotor frequency, a command frequency;
determine one or more operating parameters for the inverter based on the command frequency, the command torque voltage, and the command flux voltage; and
control the inverter based on the one or more operating parameters.

2. The system of claim 1, wherein the command torque current is proportional to the command flux current.

3. The system of claim 1, wherein the control system is configured to convert the command torque voltage and the command flux voltage from a vector control method to a scalar control method.

4. The system of claim 1, wherein the control system is configured to generate the slip frequency based on the torque current feedback and a flux current feedback.

5. The system of claim 1, wherein the control system is configured to compensate the rotor frequency with the slip frequency in order to generate the command frequency.

6. The system of claim 1, wherein the control system operates without receiving position data associated with the motor.

7. The system of claim 1, wherein the control system operates without receiving speed data associated with the motor.

8. The system of claim 1, wherein the control system is configured to cause the inverter to supply the command torque voltage and the command flux voltage to the motor.

9. A method, comprising:
receiving a torque current feedback associated with a motor;
generating, based on the torque current feedback, a command current;
generating, based on the command current, a first command voltage and a second command voltage;
generating, based on a slip frequency and a rotor frequency, a command frequency; determining one or more operating parameters for an inverter based on the command frequency, the first command voltage, and the second command voltage; and
controlling the inverter based on the one or more operating parameters.

10. The method of claim 9, comprising measuring the torque current feedback at the motor.

11. The method of claim 10, wherein the command current is generated based on the measured torque current feedback.

12. The method of claim 11, comprising generating a second command current based on the measured torque current feedback and the command current.

13. The method of claim 9, wherein the torque current feedback is a three-phase stator current of the motor.

14. The method of claim 9, comprising generating an applied voltage magnitude based on the first command voltage and the second command voltage.

15. The method of claim 14, comprising determining the one or more operating parameters for the inverter based on the applied voltage magnitude.

16. The method of claim 9, comprising maintaining the first command current above a threshold current value.

17. The method of claim 16, wherein the threshold current value is based on load properties associated with the motor.

18. A non-transitory, computer-readable medium comprising instructions that, when executed, are configured to cause a processor to perform operations comprising:
receiving a torque current from a motor;
generating, based on the torque current, a command torque current and a command flux current;
generating, based on the command torque current and the command flux current, a command torque voltage and a command flux voltage;
generating, based on a slip frequency and a rotor frequency, a command frequency;
determining one or more operating parameters for an inverter based on the command frequency, the command torque voltage, and the command flux voltage; and
controlling the inverter based on the one or more operating parameters.

19. The non-transitory, computer-readable medium of claim 18, wherein the instructions, when executed, cause the processor to perform the operations comprising summing the slip frequency and the rotor frequency to generate the command frequency.

20. The non-transitory, computer-readable medium of claim 18, wherein the instructions, when executed, cause the processor to perform the operations comprising generating the command flux current based on the command torque current, wherein the command flux current is proportional to the command torque current.

\* \* \* \* \*